US008821239B1

(12) United States Patent
Chun

(10) Patent No.: US 8,821,239 B1
(45) Date of Patent: Sep. 2, 2014

(54) GAMING TABLE SYSTEM ALLOWING PLAYER CHOICES AND MULTIPLE OUTCOMES THEREBY FOR A SINGLE GAME

(71) Applicant: Novel Tech International Limited, Hong Kong (HK)

(72) Inventor: Jay Chun, Hong Kong (HK)

(73) Assignee: Novel Tech International Limited, Hong Kong (HK)

( * ) Notice: Subject to any disclaimer, the term of this patent is extended or adjusted under 35 U.S.C. 154(b) by 0 days.

(21) Appl. No.: 13/948,101

(22) Filed: Jul. 22, 2013

(51) Int. Cl.

| | |
|---|---|
| ***A63F 9/24*** | (2006.01) |
| ***A63F 13/00*** | (2014.01) |
| ***G07F 17/32*** | (2006.01) |
| ***A63F 1/06*** | (2006.01) |

(52) U.S. Cl.
CPC ............ *A63F 1/067* (2013.01); *G07F 17/3244* (2013.01)
USPC ............................................. 463/11; 463/25

(58) Field of Classification Search
CPC ................ A63F 1/00; A63F 2001/001; A63F 2001/003; A63F 2001/005; G07F 17/32; G07F 17/3293
USPC ..................................................... 463/16, 46
See application file for complete search history.

(56) References Cited

U.S. PATENT DOCUMENTS

| | | | | |
|---|---|---|---|---|
| 2008/0108404 | A1 * | 5/2008 | Iddings et al. | 463/16 |
| 2008/0113767 | A1 * | 5/2008 | Nguyen et al. | 463/25 |
| 2013/0225276 | A1 * | 8/2013 | Au-Yeung | 463/25 |

* cited by examiner

*Primary Examiner* — Werner Garner

(57) ABSTRACT

An electronic gaming table for hosting live table games involving wagers can include a physical surface, a dealer station, a plurality of player terminals, and a table controller. The physical surface permits the play of live table games with a live dealer and physical game components. The dealer station is situated proximate the physical surface and allows the presence of a live dealer who facilitates game play. Player terminals allow live players to play the games and include player terminal processors coupled to player interfaces having input and output devices. A table controller coupled to the player terminals controls various table functions and administers a live table game pitting a first hand against a second hand. Each of multiple live players can make different live game decisions independently based upon the same second hand, wherein resolution of the game varies by player depending upon the different live game decisions.

12 Claims, 7 Drawing Sheets

GAMING TABLE SYSTEM ALLOWING PLAYER CHOICES AND MULTIPLE OUTCOMES THEREBY FOR A SINGLE GAME

TECHNICAL FIELD

The present invention relates generally to gaming machines and systems, and more particularly to gaming tables having automated components.

BACKGROUND

Wagering games such as baccarat, blackjack, roulette, and various poker-based table games, among many others, are popular games offered in casinos and other similar establishments. These games are generally played on physical gaming tables having a live actual dealer, felt or similar table top layouts, cards, dice, chips and the like, or on electronic gaming machines where the dealer, playing cards, chips or other gaming elements may be virtual. Each of these platforms has a limited capacity for players to participate in any particular game due to a limited number of player positions or a limitation on physical space about the table.

These physical space limitations have led to the introduction and growing popularity of gaming table systems having extended gaming terminals that essentially extend the capacity of a table game to include additional players in the game. These extended or remote gaming terminals can be configured to facilitate the participation of other players in a table game. For example, one popular form of baccarat can allow for the addition of numerous players about or near a physical baccarat table. Such added players are able to follow the action at the nearby table by way of one or more large video screens having a live feed of the gaming action, and can place and resolve wagers and other actions by way of electronic gaming terminals that are able to coordinate with the action at the nearby live gaming table. In such arrangements, dozens or even hundreds of players can wager on a single live baccarat game, such as by wagering on "house," "player," or "tie." The live game with physical cards is then carried about by a live dealer, whereupon a game result is achieved and all active and participating players are credited or deducted based upon their wagers and accounts.

Unfortunately, the arrangement of such large player games does not tend to work as smoothly for games where player choices are involved as a significant feature of the game. In the foregoing baccarat example, it is fairly simple for a player to wager on one of two hands, whereupon the resolution of the hand is mechanical and straightforward in nature according to rigid rules. Other games where player choices can affect the outcome of a hand or play are not as easy to administer with respect to live table games where dozens or hundreds of players participate in a single hand or play. Furthermore, while baccarat tends to involve a single hand against a single hand regardless of the number of players, other types of games often involve each player having his or her own cards or other game components. Blackjack is just one of many types of games where the addition of many more players for a single gaming table is typically difficult to administer as a practical matter.

While electronic gaming tables and gaming table systems have increased the traditionally limited player capacity for live table games, these tables and systems are a fairly recent development and there is always a desire improve the attractiveness and functionality of such systems. What is desired then are improved gaming table systems, particularly with respect to those having the ability to allow many players to participate in live table games while not severely limiting the abilities of players to make active choices with respect to the actual game play.

SUMMARY

It is an advantage of the present disclosure to provide improved gaming table systems, particularly with respect to those having the ability to allow many players to participate in a live table game while still allowing players to make active choices with respect to the actual game play. This can be accomplished at least in part through the use of electronic gaming tables and systems adapted to host live games with live dealers and physical game components, where the table or system permits player choices and resolves game outcomes differently for each player whenever the player choices diverge from each other.

In various embodiments of the present disclosure, an electronic gaming table is adapted to host live table games involving wagers, table games based on the wagers, and monetary awards based on the results of the table games. The electronic gaming table can include a physical surface adapted for the play of live table games that include the use of a live dealer and physical game components, as well as a dealer station situated proximate the physical surface and adapted to provide for the presence of a live dealer who facilitates the play of the live table games. The gaming table can also include a plurality of player terminals situated at or nearby the electronic gaming table, wherein each of the plurality of player terminals provides for the presence of a live player to play said live table games and includes a player terminal processor coupled to a player interface having one or more player input devices and one or more player output devices. In various embodiments, the number of player terminals associated with a single electronic gaming table can be a dozen, several dozen, or even over one hundred. In addition, a table controller can be coupled to the plurality of player terminals and be adapted to control a plurality of electronic gaming table functions, where the table controller is further adapted to administer a live table game pitting a first hand against a second hand. For the game, each of a plurality of live players is permitted to make different live game decisions independently based upon the same second hand, wherein the resolution of the live table game varies by player depending upon the different live game decisions of the plurality of live players.

In various detailed embodiments, the live table game at the electronic gaming table is blackjack, among other possible games. In addition, the electronic gaming table can include at least one interface in communication with the table controller and one or more gaming system components remotely located from said electronic gaming table. Such one or more gaming system components can include a remote server adapted to resolve financial transactions with respect to the table games hosted at the electronic gaming table. The remote server can also serve to process one or more of the functions that might alternatively be administered by the table controller in some embodiments. Such functions can also be performed by multiple servers, which may also serve as special purpose servers, such a video server for broadcasting play actions at other game tables, a game history server, a game search server, a table game remote audit server, an accounting server, a game database server, a social networking server, and the like. In addition, the remote server or servers can be further adapted to resolve financial transactions from other separate electronic gaming tables. This financial transaction mediation service for multiple separate tables can allow a player at a terminal to participate in multiple live table games at any given time. In such an implementation, the financial account(s) of a given player can be debited, credited, or both by multiple separate live game tables, depending on the game resolution or result of each bet placed by a player at each table. Further, each table may be located at a different gaming venue, giving rise to a multi-game, multi-site, and multi-bet gaming environment, making it critical to have a financial mediation and clearinghouse server or servers.

In various detailed embodiments involving the live game played, the first hand can be a house hand for the hosting gaming establishment and the second hand can be a player hand for some or all of the plurality of players. The table controller and/or the remote server can be further adapted to resolve a game play decision with respect to the second hand based upon collective input by the plurality of players. For example, decisions on whether to split a hand can be subject to collective input from all players. Such collective input can comprise a majority decision selected from a plurality of possible game play decisions at a given point in the play of the live table game. In some embodiments, the collective input can comprise a weighted input from each live player in the game, such as where each weighted input is weighted according to the amount wagered by the respective player. In various embodiments, varied resolutions of the live table game for different players can result in different game outcomes. Such different game outcomes can involve different players having more or fewer cards or other game components at the end of the live table game depending upon the different live game decisions of the plurality of players. For example, some players might hit where other players stand. Also, varied resolutions of the live table game for different players can involve the same game outcome but different monetary awards depending upon the different live game decisions of the plurality of players. For example, some players might decide take insurance or double down where appropriate, while others might not do so.

In still further detailed embodiments, at least one community display in communication with the table controller can be adapted to provide a display of the physical components of the table game to live players who are near but not physically at the electronic gaming table. Such a display can be a large overhead display that is visible to many all around the vicinity of the table. Live video feeds can also be used to provide the display to player terminals that are in another room or other location. That is, the plurality of player terminals can include one or more player terminals located remotely from the physical surface. In some embodiments, the table controller is further adapted to interact with one or more third party electronic devices as added virtual player terminals for additional live players to play the table games.

In various further embodiments, an electronic gaming table system can include one or more electronic gaming tables such as that which is set forth above, as well as a host server located remotely from and in communication with each of said one or more electronic gaming tables. The host server can be adapted to facilitate the processing of transactions with respect to table games played at the electronic gaming tables, and may also provide other functionalities rather than the table controllers. For example, the host server can be adapted to resolve a game play decision with respect to the second hand based upon collective input by the plurality of players.

In still further embodiments, various methods of providing a live table game at a gaming table are provided. Pertinent process steps can include, for example, providing a first electronic gaming table, presenting a live table game, permitting separate player decisions regarding and during the play of the live table game, and resolving the game according to the separate decisions. Again, the table can be adapted to host table games involving wagers, table games based on the wagers, and monetary awards based on the results of the table games. A presented live table game can have a live dealer, where a first live player and a second live player located at or near the electronic gaming table both participate in the live table game, which game can pit a first hand against a second hand, the second hand being played by both of the first live player and the second live player. Resolving the live table game for the first live player and the second live player can result in different results for the two players, such as where one elected to stand and the other elected to hit and busted his or her hand. As such, a further step can involve awarding a prize or monetary payout to the first live player but not the second live player based on the different results of the live table game. Other details from the single table and system embodiments above can also apply to the various detailed method embodiments.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for gaming tables and systems allowing choices from numerous players for a single game. These drawings in no way limit any changes in form and detail that may be made to the disclosure by one skilled in the art without departing from the spirit and scope of the disclosure.

DETAILED DESCRIPTION

Figure 1A:
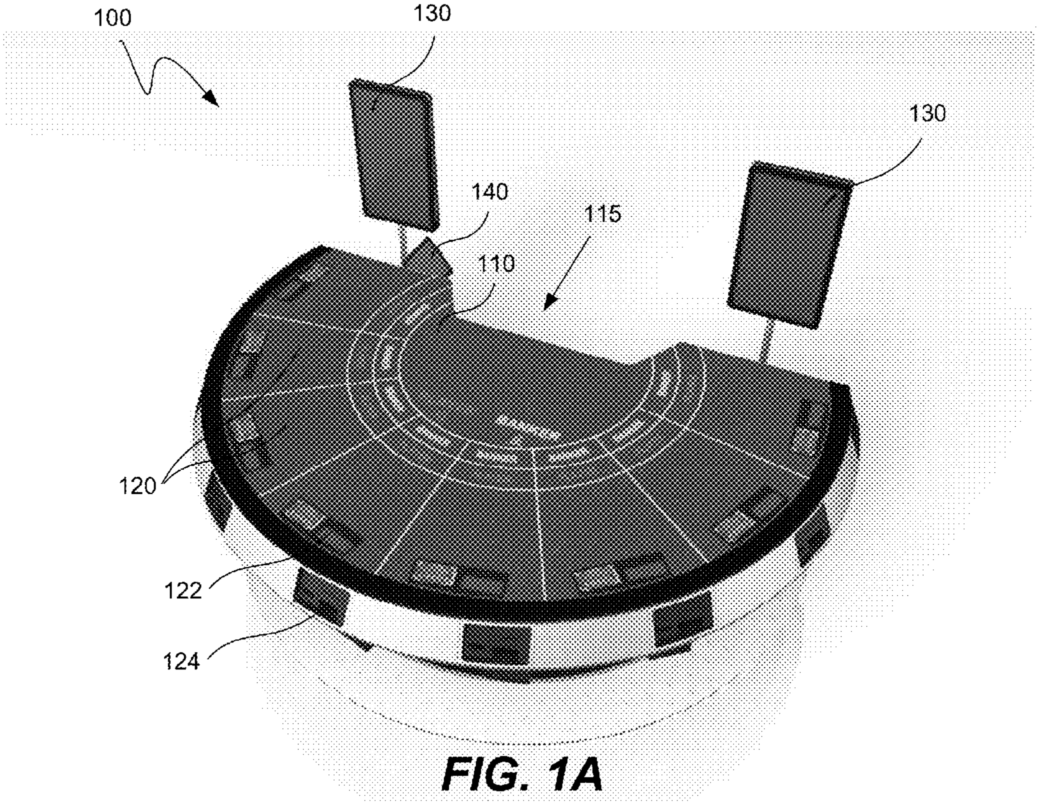
FIGS. 1A and 1B illustrate in top and front perspective views an exemplary electronic gaming table adapted for table games that allow many players while still permitting individual player choices according to one embodiment of the present disclosure.

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to systems and methods for providing, conducting and facilitating the play of wagering games at live electronic gaming tables that can include live dealers, live players, live gaming components, and an electronic platform. This disclosure may be applied to any live table game, such as baccarat, blackjack, roulette, craps, pai gow, sic bo, bingo, card games, and the like, as well as any other type of game having a live or electronic dealer and one or more players seated at a gaming table or electronic gaming platform. The various embodiments disclosed herein can be applied with respect to individual tables, entire systems, and methods of running table games.

As discussed herein, this disclosure may also be applied in a live electronic gaming table system that monitors a live table game in which physical or virtual cards are dealt to one or more players at, near, or associated with a gaming table. Alternatively, or in addition, other physical gaming elements can be employed, such as dice, chips, tokens and the like. The game play data collected is used to enable play of the same live table game remotely through gaming terminals. The gaming terminals may be any platform capable of receiving and transmitting data, including "thin-client" platforms or platforms which do not process game play data and "smart" platforms or platforms which process game play data. The gaming terminal maybe stationary, similar to the slot machines or electronic tables commonly seen at the physical casino, or portable electronic devices such as smart phones, computer tablets, portable media players, laptop computers, desktop computers, smart TV, and the like. Additionally, the respective gaming network can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. Thus, players interested in placing wagers on a live-table games are not confined to the gaming table or casino floor.

In general, the present disclosure pertains to one table or a system of multiple electronic gaming tables that allows any number of players to play on a single table, while still allowing player choices for each player with respect to the play of the games thereon. In addition, the table or system allows remote player terminals to participate as if the remote player has a seat at the physical table. A relevant electronic gaming table system can include live electronic tables ("eTables"), remote game terminals (electronic gaming machine ("EGM"), smart phone, smart TV, tablet, etc.), a central games repository and server that acquires the available live games from each eTable, indexes them and broadcasts the games and games history to other electronic tables, remote game terminals, and remote gaming sites, a multi-site games traffic server that receives remote game requests, verifies a player's eligibility (location, ID, funds), enforces jurisdictional rules, and routes eligible bets to the player's requested game "channel" being broadcasted, a financial server that acts as a Central Clearinghouse for remote wagers, and a network that connects the electronic tables, remote game terminals, the games repository and router, and the financial clearinghouse server.

A table processor and/or remote server can be used to administer the game, track player decisions and decide game outcomes for each player accordingly. Other components and items may also be present as desired. In addition to the various components, details and other aspects set forth herein with respect to the disclosed gaming table systems and remote gaming in general, further details and explanations regarding remote gaming and table game systems can be found at, for example, U.S. patent application Ser. Nos. 13/893,340; 13/844,617; 13/542,446; 13/456,110; 13/042,633; 11/497,708; 11/312,150; 11/198,218; and 11/042,732, with the entire contents of all of these applications being incorporated herein by reference in their entireties and for all purposes.

Figure 1B:
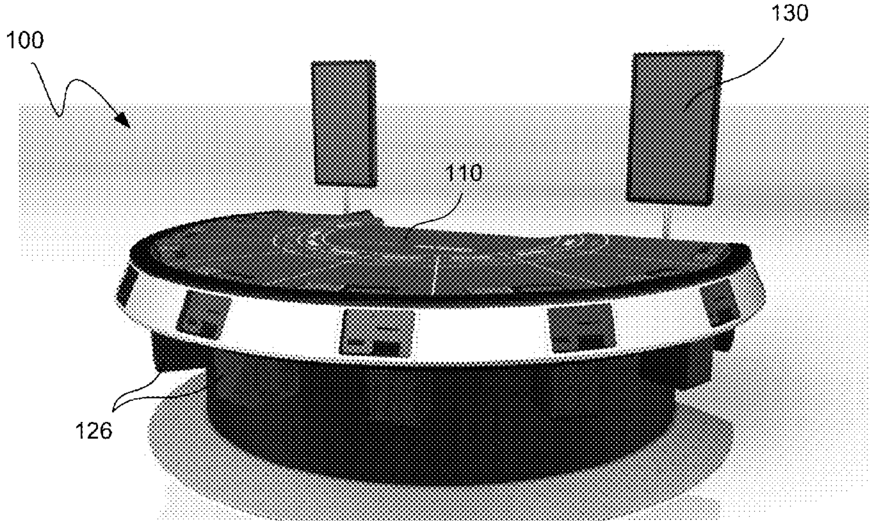

Referring first to FIGS. 1A and 1B, an exemplary electronic gaming table adapted for table games that allow many players while still permitting individual player choices according to one embodiment of the present disclosure is illustrated in top and front perspective views respectively. It will be readily appreciated that this electronic gaming table ("eTable") 100 can also be provided in numerous other configurations and formats, such that the provided example is for illustrative purposes only. The eTable 100 can include a playing surface 110 adapted for the play of live table games using live physical components, a live dealer station or region 115, a plurality of player stations 120, each of which has its own displays 122, bill acceptor, card acceptor and other input components 124, one or more community displays 130, and a dealer station display and/or computing device 140. One or more physical separators 126 may separate the different player stations 120.

Each player position 120 around the eTable 100 can have a player terminal integrated into it. Like a standalone remote gaming terminal, each player terminal can have its own controller, buttons, touchscreen display, bill validator, printer, card reader, and so forth. The player terminals can be connected to a table controller ("TC") for the entire table via a switch/hub, and the TC connects to an overall local or wide area network, as provided in greater detail below.

Each eTable 100 can be hosted by a live dealer, such as at a dealer station 115. The live dealer deals real cards, one or more roulette wheels, and/or uses real dice or other physical game components, which can be done on a wooden green-felt table surface 110. The cards can be drawn from an electronic shoe ("eShoe"), which is connected to the TC on the local table network. In some embodiments, the eShoe scans the cards and reads the rank and suits for each card removed. The TC, via player login data (such as player tracking card swipe or a cash insertion at the bill acceptor), knows which positions at the table are active and thus can monitor the progress of a game. One or more table sensors, such as a camera, RFID reader, or the like, can be used to capture video of the dealer action for broadcasting, as well as tracking of players and physical game components through a variety of means. The camera can also be used to further verify and keep a log of game activities, such as, for example, cards removed from the eShoe, cards dealt to player positions, bets entered, new players, and the like.

The eTable 100 also has one or more displays. In one embodiment, there can be one or more community displays 130 to show common player information, such as community cards, table wager minimum, casino name, time, advertisements, voting results and resulting game play dispositions, and the like. Game history (e.g., baccarat roadmaps) may also be displayed on the same screen 130 or on a separate screen attached to the eTable 100. Additionally, game histories, trends, patterns and/or statistics from other tables, or even other gaming venues, and other game types, may also be displayed. This can help players in selecting other games that they might also want to play at the same time or to otherwise monitor other games and gaming environment at a given time, such as in the same manner that an investor in the financial stock market monitors the stocks, stock indices, news and other market indicators. In some embodiments, the community display may show other or added information, such as the ranks of top players, popularity of tables (e.g., top tables with the most number of active players), top game types (e.g., roulette, baccarat, black jack, poker, pai gow, mahjong), and so forth. The eTable may also have discrete displays such as On/Off/Flashing lights mounted underneath table graphics to annunciate game information such as Banker Win, Player Win, New Game, No More Bets, and so forth. Such table screens and discrete displays can be driven by the TC.

Figure 2:
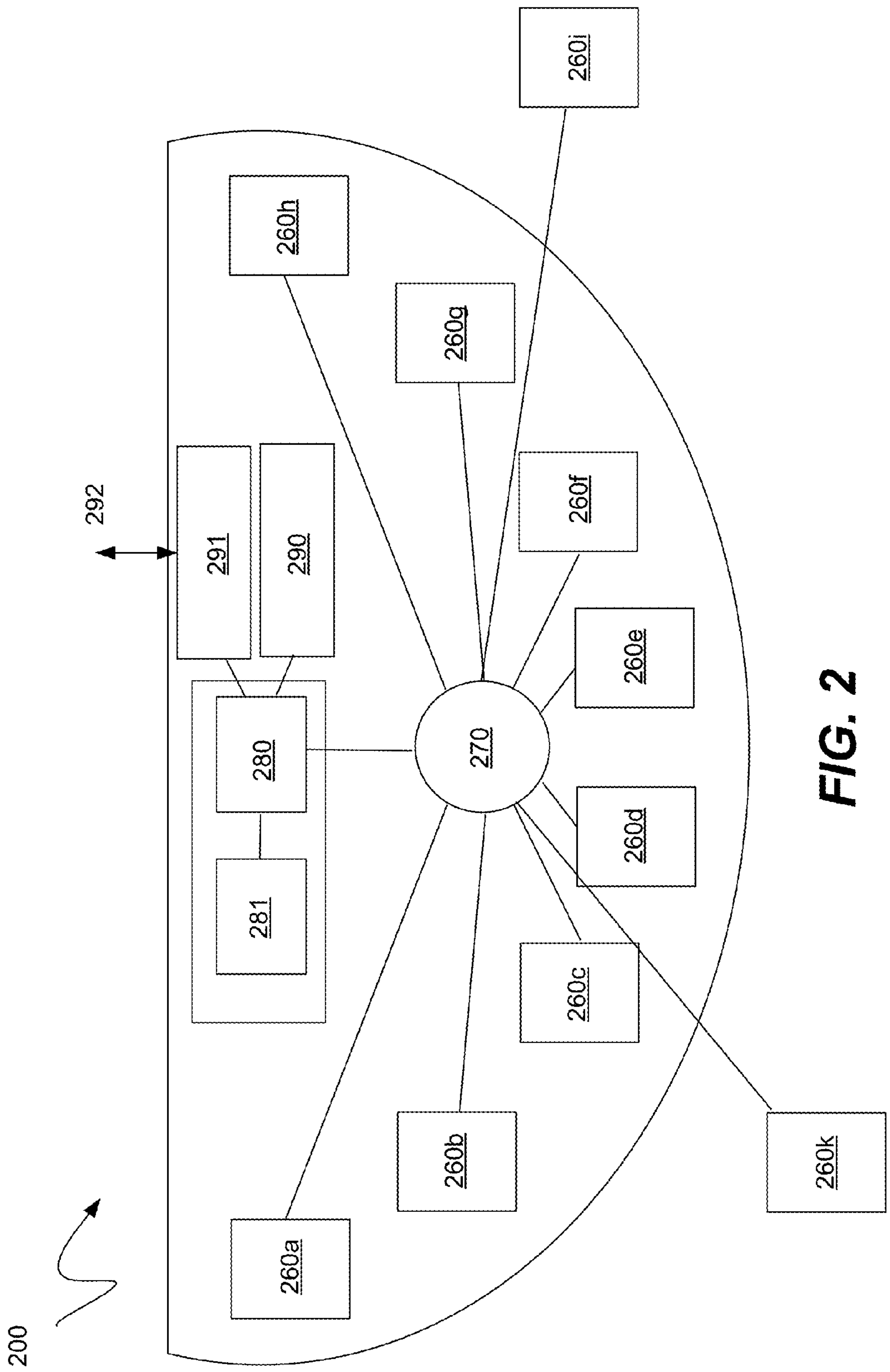
FIG. 2 illustrates in block diagram format an exemplary computing system for an electronic gaming table adapted for table games that allow many players while still permitting individual player choices according to one embodiment of the present disclosure.

Continuing with FIG. 2, an exemplary computing system for an electronic gaming table adapted for table games that allow many players while still permitting individual player choices is provided in block diagram format. Computing system 250 for an eTable can include various individual processors and peripherals 260*a*-260*k* for a plurality of player stations. In various embodiments, each of these separate items can be an identical or substantially similar set of processors, displays, inputs and other components, as may be desirable for each separate player station. As shown, some of the player stations (e.g., 260*a* through 260*h*) may be physically present at the eTable 200, while other player stations (e.g., 260*i* and 260*k*) may be located away from the eTable. Such remotely located player stations can be nearby the table and within view of the playing surface and/or an overhead display of the playing surface. In addition, one or more remotely located player stations can be located in a different room or different location entirely, such as where a video feed of the live table game can be provided to the player station for live play. Such remotely located player stations can be mobile devices, and/or can also be third party devices. Examples of third party mobile devices that could serve as a player station can include smart phones or tablet computers that are adapted to interact with the eTable and/or the associated system running games thereon.

All of the player station systems 260*a*-260*k* can couple to a central router or hub 270, which is coupled to a master table controller ("TC") having a CPU 280 and memory or storage 281. The TC can be coupled to one or more table displays 290, as well as an interface 291 for outside communications. Such table display(s) 290 can provide views of the playing surface to many more players that may be nearby the table but not in position to have a good view of the playing surface. In this manner, dozens or hundreds of players can be playing at a single table. Link 292 represents the connection to the network, so that system 250 is able to communicate with various other network or system components.

In various embodiments, a remote game server can administer some or all of the game away from the actual physical table. The remote server can have the rules of the game, and can be responsible to conduct the table game, such that the TC only conducts data acquisition. As such, the TC can be connected to the card shoe, shuffler, camera(s), dealer terminal, chip counter, overhead display(s), and so forth. In operation, the TC can collect raw data from these peripherals and then provide this data to the host game server located remotely. The remote host or game server can then provide any number of functions, such as, for example, to process the game according to game rules, store the game states, keep track of game history, resolve player hands, credit or debit player accounts, run the community display, and the like. Data from each player terminal can be collected by the table processor (i.e., TC) and forwarded to the remote server, can be sent to the remote server directly from player terminals, or some combination thereof.

In embodiments involving a remote game server, such a game server of the system may be adapted to handle multiple tables simultaneously. In such embodiments, the system can also broadcast games or action at multiple tables to each remote player terminal, thus allowing the player to watch other games and/or participate in more than one game at the same time.

In other embodiments, the TC itself can perform all of these functions during game play. In such embodiments, the eTable can be an isolated stand alone device, such as a single gaming machine or component. In some such arrangements, only final accounting results can then be forwarded to an overall casino or gaming system or other gaming network, as may be desired.

In various embodiments involving a remote server, a TC that runs most or all of the game functions, or both, the effective game controller can calculate the game results and then send such results to the live dealer for the final game decision. That is, the live dealer can be the final arbiter of the game results as provided by the appropriate game controller or processor. This redundant decision maker can assure a more robust game, as the dealer can correct game errors and make other actions before broadcasting any final game and payout results or resolutions.

In various embodiments, there may or may not be live players at the eTable. That is, in some embodiments the eTable may not have any live players sitting at the table, and rather has only the dealer, playing surface, cards and/or other live physical game components. In such embodiments, all live players may wager on and participate in the game action through remotely located game terminals. Again, such remotely located terminals may be nearby the eTable and within view of the playing surface and/or one or more community displays. For example, such nearby terminals can be within 100 feet of the eTable. Of course, further distances and/or removed locations to other rooms or properties are also possible, such as where the remotely located players can view a video of the live game action via other game terminal types such as a computer terminal, a tablet computer, a smart phone, a smart television, and the like. Such other game terminals can be mobile and/or third party devices, such as in the case of smart phones, tablets, and other similar devices.

Figure 3A:
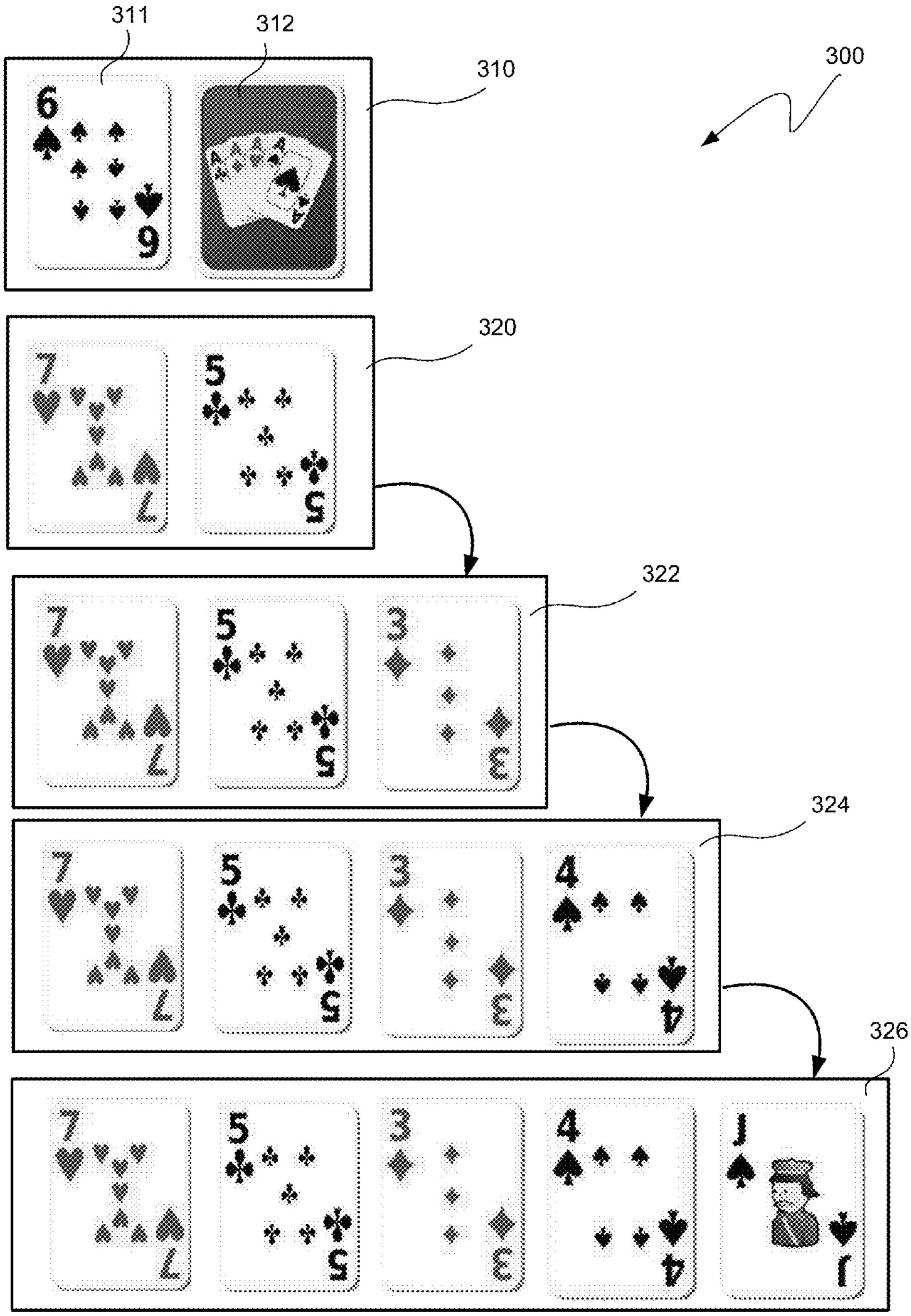
FIG. 3A illustrates in block diagram format the play of an exemplary hand allowing for different player choices from many players at an electronic gaming table according to one embodiment of the present disclosure.
Figure 3B:
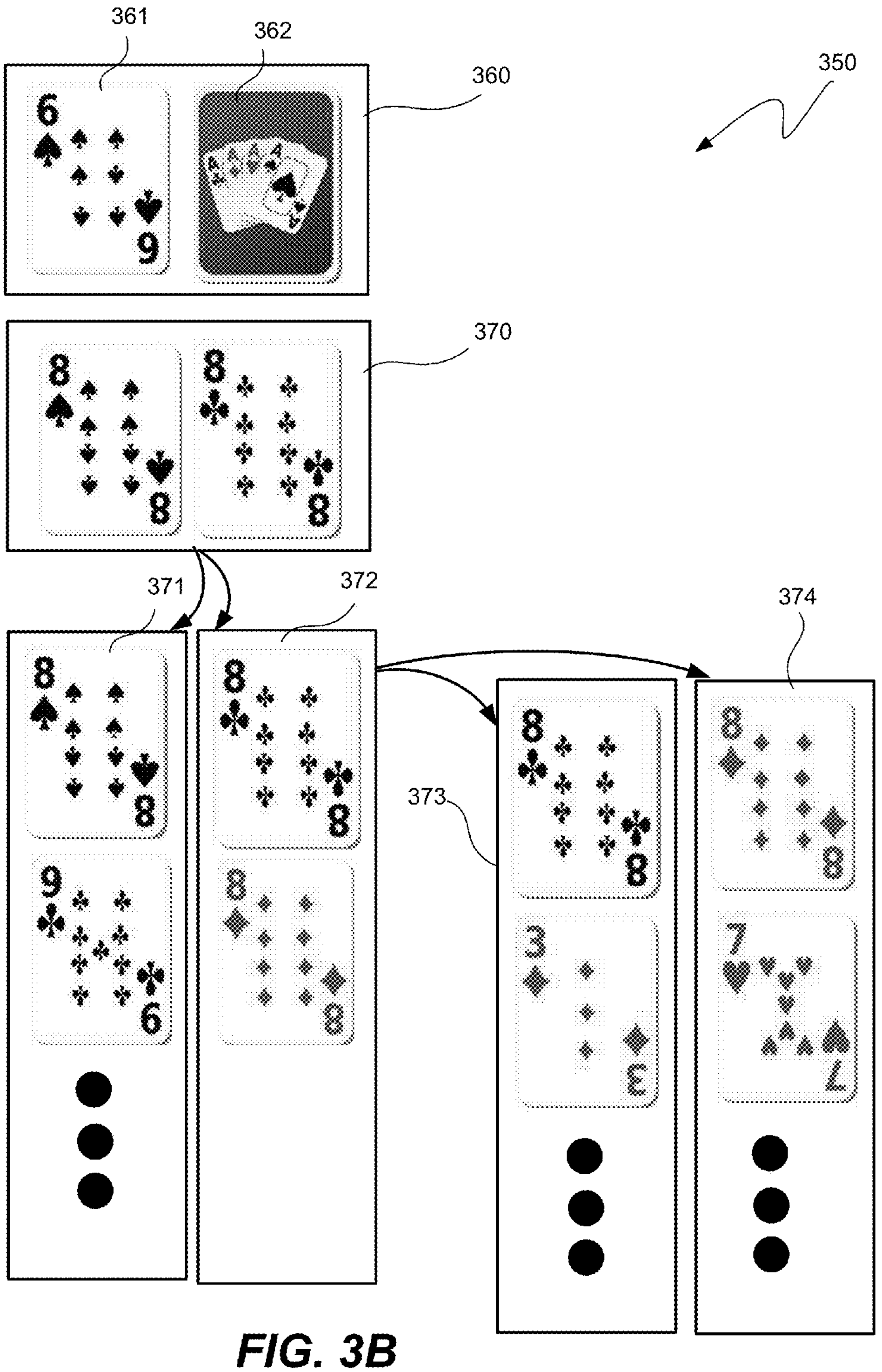
FIG. 3B illustrates in block diagram format the play of an exemplary hand allowing for different player inputs from many players for a collective decision at an electronic gaming table according to one embodiment of the present disclosure.

Turning next to FIGS. 3A and 3B, various examples are provided of game play for numerous players on a single hand where players are able to retain certain player choices that decide game outcomes. While the game of interest is blackjack in the provided examples, it will be readily appreciated that the concept and principles disclosed herein may be applied to other wagering and casino games. First, FIG. 3A illustrates in block diagram format the play of an exemplary hand allowing for different player choices from many players at an electronic gaming table according to one embodiment of the present disclosure. Exemplary blackjack hand 300 can include a single dealer hand 310 and a single player hand 320. While only a single player hand 320 is provided, it will be readily appreciated that multiple player hands can also be present, with the same principles and details set forth herein being applied to each of the different player hands. As per standard blackjack rules, wagers on the player hand 310 or hands are typically made prior to the deal of cards.

Dealer hand 310 can include a face up card 311 (e.g., the six of spades), and a face down card 312. The player hand 320 can include two cards (e.g., the seven of hearts and the five of clubs), upon which each active player can then make a choice. As will be readily understood per the standard rules of blackjack, a player may choose to "hit" or "stay" on the cards set forth in player hand 320. For purposes of illustration, Player A decides to stay, while each of Players B, C, and D decide to hit. Player A is thus frozen at a hand value of "12." The next or "hit" card (e.g., the three of diamonds) is shown in the progression at player hand 322. At this point, all players that hit the player hand 320 now have another decision whether to hit or stay. Again, for purposes of illustration, Player B decides to stay with a hand value of "15," while Players C and D decide to hit one more time.

The next or hit card (e.g., the four of spades) is shown in the next player hand progression at 324. At this point, Player C decides to stay with a player hand value of "19," while Player D decides to hit again for some reason. The final hit or "bust" card is shown as the jack of spades at player hand 326, upon which Player D automatically loses the hand. At this point, the dealer hand 310 is then played per the standard rules of blackjack. If the dealer busts, then each of Players A, B and C win the hand. If the dealer makes a final hand of 17 or 18, then only Player C wins. Of course, if the dealer makes a final hand of 20 or 21, then all players lose.

In the foregoing example, it will be readily appreciated that each of Players A, B, C and D can represent dozens or even hundreds of live and active players wagering on the same player hand 320. Each of these players is provided with the same decision ability regarding the play of the hand as noted above, and each player is provided with a final hand value and resolution against the final dealer hand according to the individual player decisions made. As will be readily appreciated, this can result in some players winning and some players losing on the same player hand. Of course, "pushes" or ties may also be attributed to some players and not others, as will be readily appreciated.

Other player choices may also be provided to each player as may be applicable. For example, the ability to take "insurance" against a dealer ace, as well as the ability to elect to "double down" may be chosen by some players but not others as these opportunities arise for a given player hand that is wagered upon and played by multiple players. Appropriate hand resolutions and monetary awards can then be calculated accordingly as to whether a given player has elected for or against insurance, or for or against doubling down, as may be applicable. For example, where one player may decide to double down and another does not, both players may wind up with the same hand value and the same win against the dealer hand. The player that elected to double down, however, would win twice his or her wager, while the other player would only win the original wager for the same hand result.

In the event of each player choice, it may be practical to provide each player with a certain amount of time to make and lock in a decision. For example, ten or fifteen seconds may suffice. Other time periods are also possible, as may be desired for a given gaming operator. In some embodiments, it may also be possible to grant each player an occasional ability to ask for more time to consider a decision. For example, once every hour or session, a player may request an extra ten or fifteen seconds to make a player decision. Of course, it may be prudent to limit all players overall, so as to maintain the pace of the game for the vast majority of players that prefer to play at a regular rate. In some embodiments, the amount of time given to a player to make a decision can vary, and different eTables can provide for fast or slow games accordingly. Players can then elect to play at a table that suits their particular game speed and preferences.

Where a player does not make any player choice within the given time allotted for such a decision, there can be an understood default selection. For example, where a player is provided with a decision to hit or stay, a no decision with the given time period can default to a "stay" decision. Other no decisions within the given time period can default to other options, as may be preferable.

As may be appreciated, however, it may not be possible or practical to provide every player choice to every player for every hand. For example, where split hands and multiple split hands may cause high complexity and bog down games, players can be provided with a collective voting ability on how the hand is to proceed rather than individual abilities to choose to split or not split hands. Other player options and choices can resort to player voting as may be appropriate or desired for a given circumstance or other types of games, as will be readily appreciated.

FIG. 3B illustrates in block diagram format the play of an exemplary hand allowing for different player inputs from many players for a collective decision at an electronic gaming table. Exemplary blackjack hand 350 can similarly include a single dealer hand 360 and a single player hand 370. Again, while only a single player hand 320 is provided, it will be readily appreciated that multiple player hands can also be present, with the same principles and details set forth herein being applied to each of the different player hands. Again, the dealer hand 360 can include one upcard 361 and one downcard 362. Player hand 370 can include a pair, which may be split per the regular rules of blackjack. As shown, a pair of 8s may be split or not split. In order to reduce game complexity where some players want to split and others do not, with a resulting mess of cards for single or multiple player hands stemming from the original pair of 8s, a collective player vote can be taken.

That is, rather than allow each player to make a player decision that affects him or her only, each player can be permitted to cast a vote as to whether the player hand should be split or not split. In some embodiments, a simple majority can then be tabulated to decide whether the hand is split or not. After the hand is split (or not), then each separate player hand can be played normally, with player hit, stay and/or double down decisions being made individually with individual consequences by each separate live player. In other embodiments, player voting can be weighted, such as by preferred players, bet size, or other criteria. For example, the collective player vote on whether or not to split (or any other collective player decision) can be granted based upon the input votes weighted by bet size. Where Player A has wagered $10 on the player hand, then 10 votes are given to the choice of Player A, but because Player B has wagered $100 on the same player hand, then 100 votes are given to the input decision of Player B.

Alternatively, a single dominant player may be the decision maker for all players at the table. For example, a player that is "banking" the house hand, or one with the largest game bet on the player hand may have the sole choice as to the decision that is made for a given instance (e.g., split or no split). In the event of equal, weighted, or other types of collective player input for a voting decision, again a time limit can be placed on all active players. In the event that no input is made by a given player by the time limit, then a default vote can be entered. Alternatively, no vote can be entered in such instances.

In the example illustrated in FIG. 3B, the collective player vote decides that the pair of 8s should in fact be split, which results in two player hands 371, 372. The first player hand 371 is given a nine of clubs, whereupon players can elect to stay or hit again. The second player hand 372, however, is given another 8, whereupon another split decision can be voted upon. Again, the collective player vote can result in another split, with player hands 373 and 374 resulting therefrom. Each of these hands is given another card (e.g., the three of diamonds and the seven of hearts), whereupon each hand is then played in turn per the standard player decision making and hand resolution as set forth above.

Figure 4:
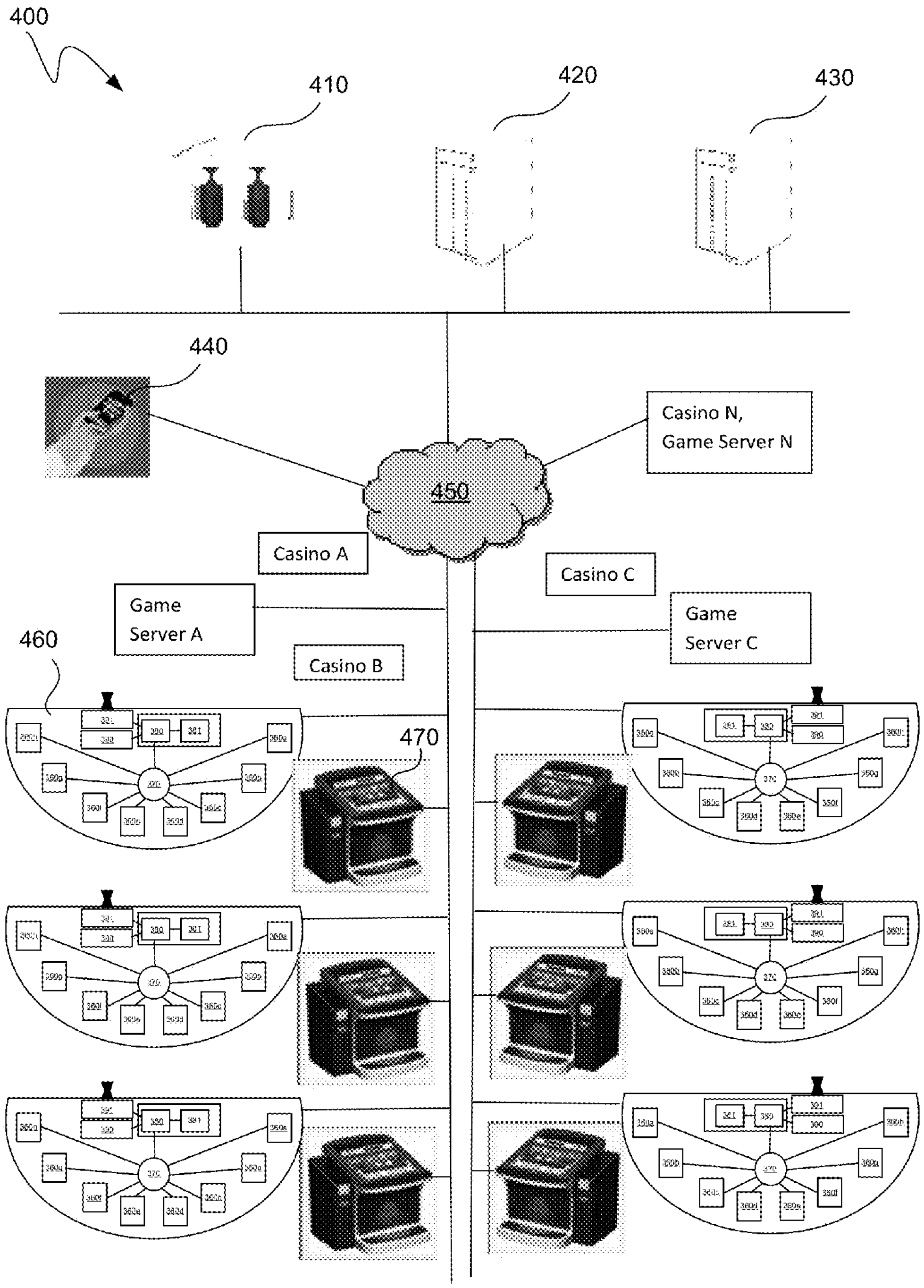
FIG. 4 illustrates in block diagram format an exemplary electronic gaming table system utilizing multiple tables such as those in FIGS. 1A, 1B and 2 according to one embodiment of the present disclosure.

Moving now to FIG. 4 an exemplary electronic gaming table system utilizing multiple tables such as those in FIGS. 1A, 1B and 2 according to one embodiment of the present disclosure is illustrated in block diagram format. Wide area system 400 can include a wide variety of components and items, such as a bank 410, a games router 420, and a financial clearinghouse 430. A cloud 450 or network can couple these items to various eTables, terminals, game servers, casinos, and other distributed components. As noted above, one or more personal devices 440 can serve as remote player terminals in some embodiments. Such personal devices can be third party and/or mobile devices, such as a smart phone, tablet computer, laptop computer, PDA, or the like. Various networked casinos, game servers, eTables 460 and other remote terminals 470 can also be coupled through the cloud 450 or network in system 400.

One or more game servers may be present in system 400, and each operates in a particular manner to facilitate the play of the various table games set forth above. In such embodiments, a game server can collect live game information from each eTable, apply game rules, and return game results. Beside monitoring and controlling the games, the game server also keeps track, in a database, of game history of each eTable, accounting information, revenue reports, maintenance information, and the like. Each of these individual functions can be performed by a separate application on a separate server, or integrated into one application running on one comprehensive server. The determination of one or multiple servers and applications depends on the number of eTables, game stations, remote gaming terminals, both local and remote, that are being connected across the system.

Each separate casino or gaming establishment can have its own one or more game servers, and each game server can be configured to serve a particular game type (e.g., baccarat, blackjack, roulette, craps, and the like), a quantity of tables or game stations, or an area of the casino. In a multi-game, multi-site environment, one important function of the game server is the handling of financial transaction from remote game terminals. In prior arts, remote game terminals are logged into a particular eTable. From there, the remote player either participate directly as if he is sitting at the table, or back bet on one of the players at the table. In system 400, however, a remote player need not be constrained to any particular physical eTable. For instance, a player sitting at a seat on a local eTable can wager on the game on going at the local table and at another table at the same casino, or at an eTable at a casino located elsewhere. These capabilities are enabled by a network of game servers, one or more games routers 420, and a central financial clearinghouse 430 for remote wagers.

Another function that can be performed by each game server across multiple establishments is the push of live game information to the game server to be broadcasted to remote gaming terminals. Here, the game server can reconstruct a live physical game in a number of ways, such as by mashing up live video feeds of the game being played at the local eTable, the digital rendition of the game pieces (cards, dice, roulette wheel, etc.), the bet options (bet board), and the like, into a composite video stream and/or digital presentation for broadcasting. In short, the live game at the eTable can be broadcast to other gaming sites like TV channels being broadcast by cable TV system to eligible subscribers. Utilizing such a design, and in separating the game presentation from the bet actions, allows many remote devices to participate in a given live table game. Again, such devices can include a remote EGM, smart phone, tablet computer, laptop, smart TV, and the like.

A games router 420 can be a match maker between a given live eTable and a remote bettor or player. In operation, games router 420 receives search requests from the various remote game stations, matches up the search requests with the available live table games in its database, and directs the multitude of live game broadcasts to their requestors and subscribers. Again, such requests for remote play can come from remote EGMs, remote terminals, remote mobile devices such as third party smart phones or tablets, remote eTable players, and so forth. The games router 420 also monitors its subscriber-base for remote wagers from the subscribers. When a remote wager is received, the games router 420 verifies the eligibility of the wager prior to allowing the remote EGM to make a wager. Such verification can be based on EGM location, rules related to that location, player ID, funds available, and other relevant criteria. Once a remote wager is accepted at the eTable, the games router notifies the financial clearinghouse, which in turn handles the wager settlement based upon the game outcome. Then the local game server that services the remote EGM is notified, such that proper revenue accounting can take place, along with an audit trail for account reconciliations and/or dispute resolutions if that becomes necessary. Games router 420 can also handle notifications to remote players regarding wins, losses, account values, and the like.

Like the financial clearinghouse of a stock market, the financial clearinghouse ("FCH") 430 can be a centralized entity that keeps track of all of the remote wagers and all of the eTable(s) and remote terminals involved. At the end of each game at each eTable, the FCH 430 settles all accounts by crediting or debiting them. Such accounts can include each live player account, each remote player account, an overall eTable account, and any other pertinent account that requires resolution. FCH 430 receives remote bets from the games router 420 and the game results (e.g., win/loss, and paytable information) from the local games server for the particular eTable 460 involved in a given game. In one embodiment, a player account can be pre-established with the FCH 430, and the FCH can credit the player account directly at the casino where he or she is playing, or at his Bank 410, if that has been arranged. In another approach, the FCH 430 sends the settlement funds directly to the player station, EGM or remote terminal where the player is actually located. This can be a preferred approach for cash players, for example.

In various embodiments, remote gaming terminals 470 can be fully robust or even thin client gaming terminals that are allowed to participate in live games remotely from eTables in the overall system. As in the case of player stations at the eTables, the remote gaming terminals can be adapted to play in multiple live games, which can be done simultaneously and where the games are different from each other. A remote game terminal 470 can be similar to a video slot machine, with all the typical peripheral devices attached such as a coin or bill acceptor, display, player tracking card reader, printer, and the like. The main difference is that it is remotely located from the live table game, is connected to the eTable system network, and receives its live game feed from a game router.

A remote gaming terminal 470 may be provided as a kiosk, an interface at an electronic gaming device or eTable, a hand-held device, cellular phone, tablet, smart TV, or other device networked (locally or via the Internet, for example) to the overall system 400. A data communication device may be positioned at a gaming table and configured for receiving game play data randomly generated during play of the live table game, either through manual input or automatic input of game play information, such as the gaming symbols on the cards dealt, to the communication device. The communication device can be a PDA or smart phone 440, for example. Such a device can be at a live eTable, or can be a remote gaming terminal separate from all system eTables, similar to terminals 470.

In various embodiments, game play information may be manually input to data communication device through a manual input device such as a keypad or touchscreen. Alternatively, electronic scanning, recognition and detecting devices known in the art may be used to read cards, determine the location of a roulette ball, or ascertain the results of a dice game, and then automatically transmit the information via communication device. Game play information may also be automatically input using a camera mounted over the live table game to obtain game information, or through one or more card reading devices, such as an optical reader mounted in a gaming table, card delivery shoe, or card shuffler, which is capable of decoding the gaming symbols shown on physical playing cards. Alternatively, such as in electronic gaming platforms in which physical cards are replaced by virtual cards, the gaming data may derive from the random number generator used to generate random virtual cards.

The data communication device receives and transmits game play data, which can be live or randomly generated as a result of playing the live table game. Processing device facilitates comparing the game play data with the rules and/or criteria for winning the wagers stored in data storage device, and determining an outcome of the wagers placed on the live table game via a data communication device of gaming terminal 470. If the criteria are satisfied, then the wager is won, whereas if the criteria are not satisfied the wager is lost. A display device at the gaming terminal 470 can be configured to facilitate the entry of wagers, show a live multimedia feed of the table game being played and communicate the outcome of any wagers placed.

As one example, system 400 may be configured to provide the option for a player to enter remotely into a live conventional blackjack game through an eTable 460 or remote gaming terminal 470. A player using gaming terminal 470 may choose to participate in the live blackjack game or play another remote blackjack game in which the rules are different, such as the rules for dealing cards to reveal their value, or rules relating to the wager size (minimum, maximum, increment), or rules relating to payout associated with game symbols and symbol combinations, or rules allowing for a wild card, or in a blackjack variant in which the rules differ in any way from conventional blackjack. The cards dealt in the live game can be correlated by system 400 with the cards to be received in the remote wagering game according to its rules in order to resolve all wagers placed in the remote wagering game.

System 400 may be configured to be responsive to an additional request for randomly generated game play data, which may be necessary for resolving a remote wagering game played by a remote player. For example, system 400 may inform the dealer at the live table game through a communication device or display 140 to continue to deal a certain number of randomly shuffled cards above the amount needed to resolve the live table game, or system 400 may be in communication with a random number generator for the purpose of generating any amount of random gaming symbols necessary to match the amount necessary in the remote wagering game or add on to the random gaming symbols acquired from the live table game.

In another example, system 400 is configured to provide the option for a player to enter into a live conventional blackjack or play a remote blackjack game which includes one or more side wagers. Players may place the side wager through a player station at an eTable 460 or remote gaming terminal 470. Either live game component results and/or randomly generated gaming symbols received via a communication device can be compared via appropriate system processing, with criteria for determining the outcome of the side wager the determining whether the game outcome is favorable or negative. If favorable, then the side wager will be won and the player appropriately credited.

For example, a remote blackjack game may allow for the player to wager on receiving a hand that has achieved a poker rank such as a pair. The physically dealt cards and/or randomly generated gaming symbols dealt in the live conventional blackjack game are received and compared with the criteria that the gaming symbols corresponding to the player's hand in the remote blackjack game comprise two cards of the same rank. In yet another example, the game of baccarat may be played live and broadcast to player terminal 470, along with various remote baccarat variant games that include different rules, such as no-commission versions, variations on pay tables, or which include additional side wagers, which may include progressive side wagers, mystery jackpots or bonuses. Thus, players at a player station at an eTable 460 or remote gaming terminal 470 are capable of participating in many variations of baccarat games with the same hand delivered in the live table game.

Players may therefore have a variety of options to play other wagering games than the live table game. However, system 400 may be configured so that only the remote wagering games that rely on the same amount or plurality of gaming symbols, or game variations that belong to the same game families (variations of Baccarat, Roulette, Sic-Bo, and the like) as those gaming symbols which are physically determined and/or randomly generated in the live table game are offered as available to players through the actual eTable.

System 400 may be configured to provide a simulation of the remote wagering game wager on by players using a player station or remote gaming terminal. The simulation may be presented on a suitable display according to the rules of the remote wagering game and may take any form, such as a display of playing cards being dealt by a virtual dealer or the actual dealer in the live table game, which would enhance the overall player experience. System 400 may be configured to provide a new display or skin on a display device of a station or gaming terminal and provide customized playing cards for the remote wagering games to distinguish between games and provide proprietary information, among other things. Variations in game rules, wager size and pay tables affecting payout amounts and volatility that are different from that of the live table may also be applied to the games at the remote game terminals to provide a favorable personalized player experience.

Figure 5:
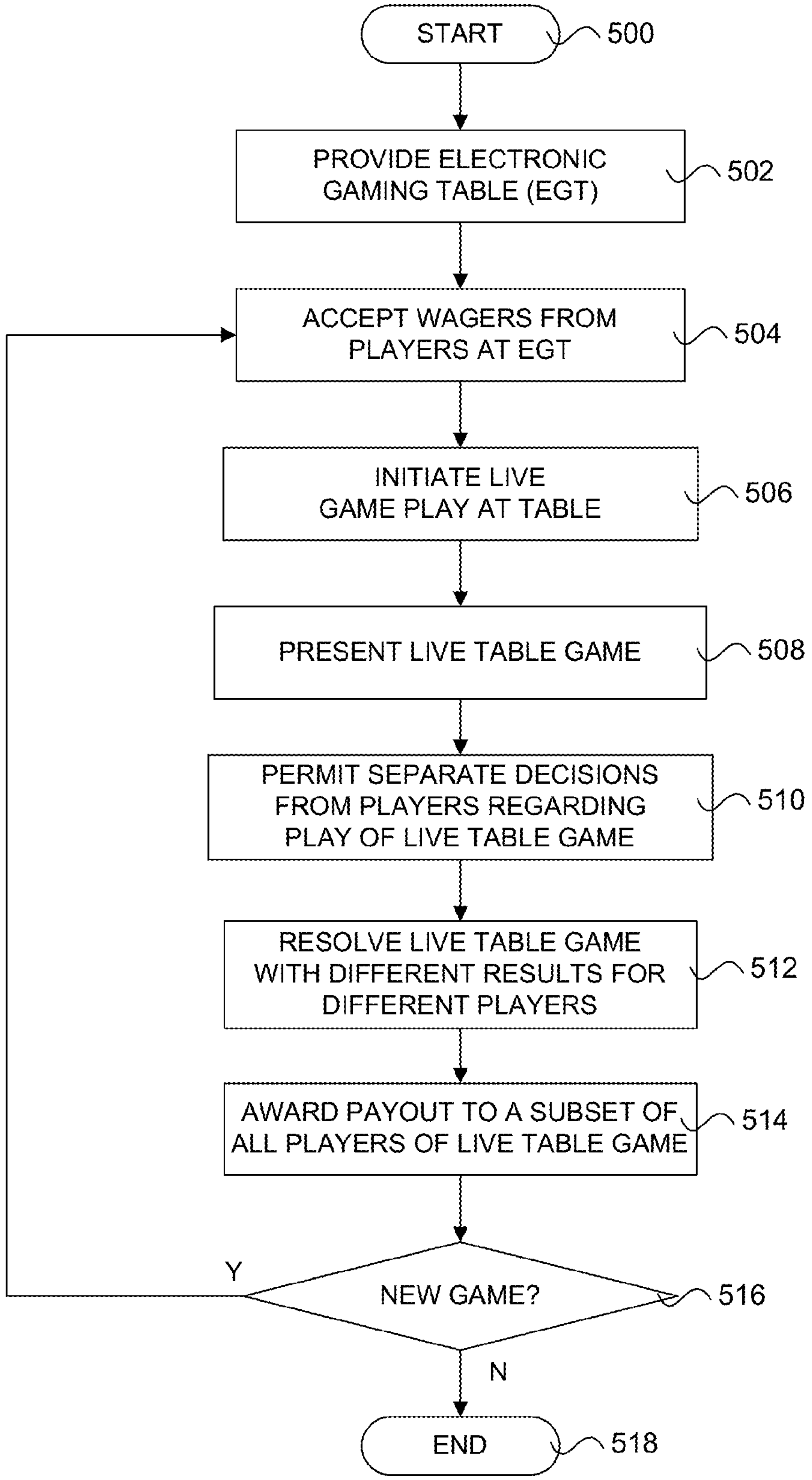
FIG. 5 provides a flowchart of an exemplary method of providing a live table game allowing choices from numerous players for a single game according to one embodiment of the present disclosure.
Figure 6:
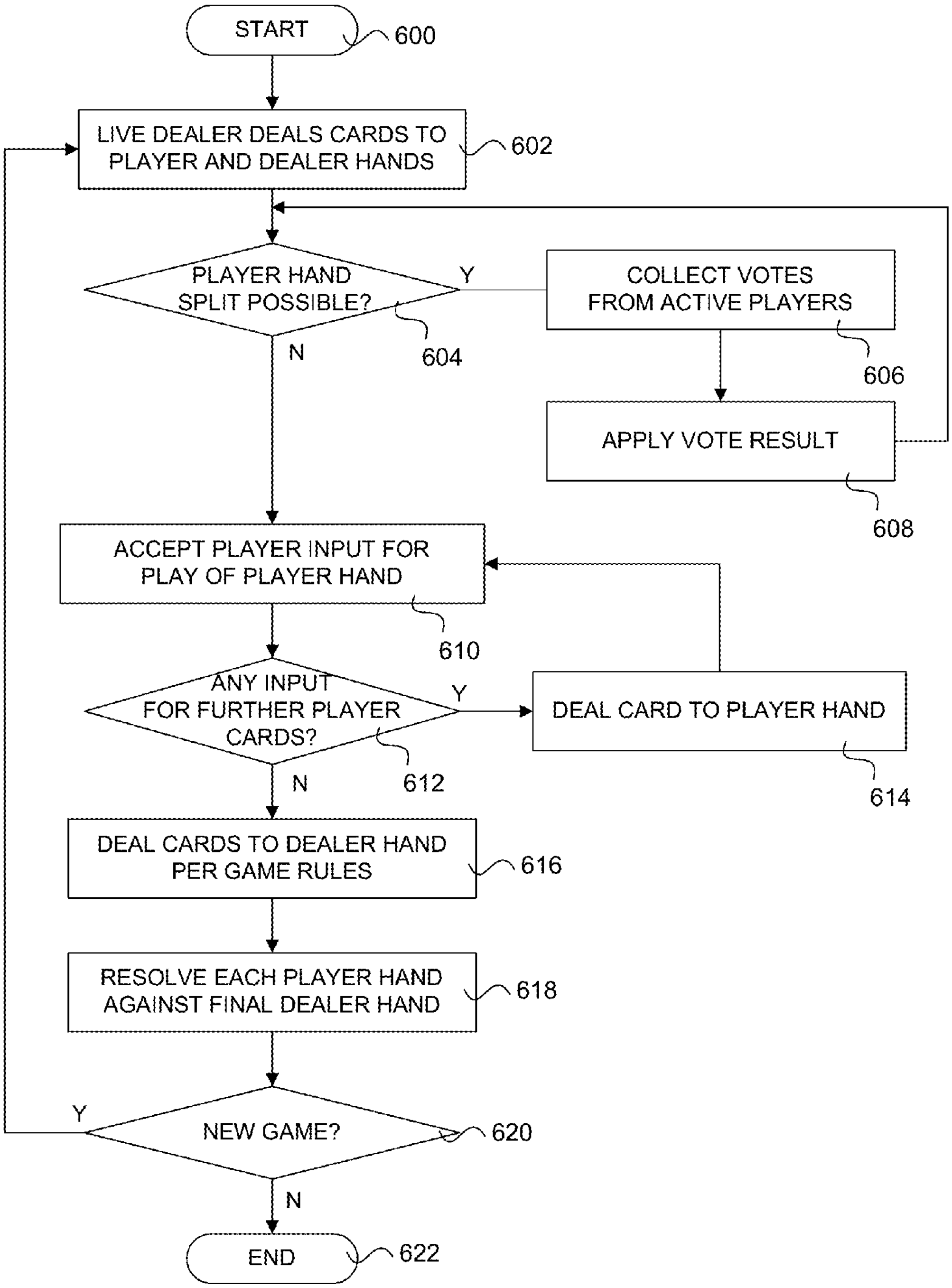
FIG. 6 provides a flowchart of an exemplary method of playing a live table game according to one embodiment of the present disclosure.

Turning now to FIGS. 5 and 6, various methods of providing player choice games for multiple players on a single table are illustrated. FIG. 5 provides a flowchart of an exemplary method of providing a live table game allowing choices from numerous players for a single game. After a start step 500, an electronic gaming table EGT is provided at process step 502. Such an EGT can be that which is set forth above for example. Monetary value and wagers from players are accepted at player station or other gaming terminals at process step 504. Again, this can be at a player station at an eTable or EGT, at a remote terminal, or at any remote playing device. The monetary value can be by way of coins, bills, cards, or other acceptable cash or valuable credit offered by the player. The monetary value can be validated and sent to the TC of the respective eTable for which a game is to be played at process step 504.

At a following step 506, a live game play can be initiated at the EGT or eTable. This can be done by a live dealer starting to play a game with the appropriate physical components, which can be cards, dice, wheels, chips, tokens, and the like. The TC at the EGT can process the live game play data, and the live table game is presented at subsequent process step 508. Separate decisions from different players can then be permitted at process step 510, after which the live table game is resolved at process step 512. Resolution of the game can result in different outcomes or results for different players based upon the separate decisions from step 510, which separate decisions may or may not be identical for all players.

Payouts can be awarded to players at the following process step 514 according to the resolution of step 512. In some instances, this can result in payouts to some players, but no payouts to other players. For example, where some players have busted but other players have stayed and the dealer hand has busted, then the staying players receive payouts while the busted players receive none. An inquiry is made at decision step 516 as to whether a new game is desired. If so, then the method reverts to process step 504 and the entire process from that point is repeated. If not, then the method ends at end step 518.

FIG. 6 provides a flowchart of an exemplary method of playing a live table game according to one embodiment of the present disclosure. After a start step 600, then the live dealer can deal starting cards to the player and dealer hands at process step 602. At a following decision step 604, an inquiry is made as to whether a player hand split is possible. If so, then the method moves to process step 606, where votes are collected from the active players. The vote result is applied at process step 608, and the process reverts back to decision step 604 to inquire if any further splits are possible. In the event that no splits are possible, then the method continues to process step 610, where individual player inputs are accepted for the play of the player hand. For example, each player can be provided with a choice as to whether to stand, hit or double down. At subsequent decision step 612, an inquiry is made as to whether any further player input is possible. If so, then a card is dealt to the player hand at process step 614, and the method reverts to process step 610 for further player inputs from those players that chose to hit or otherwise proceed. This process is repeated until no further hits or possible or no player chooses to hit, upon which the method then moves to process step 616.

At step 616, the dealer then deals cards to the dealer hand per the regular rules of blackjack. Each player hand is then resolved at process step 618 per the decisions that each player made previously and the result of the dealer hand. Any payouts are made as may be required as well. An inquiry is then made at the following decision step 620 as to whether another game is desired. If so, then the method reverts back to process step 602 and the entire process is repeated. If no further hands are desired, however, then the method ends at end step 622.

For both of the foregoing flowcharts and methods, it will be readily appreciated that not every method step provided is always necessary, and that further steps not set forth herein may also be included. For example, added steps to involve additional eTables or third or more live table games may be added. Furthermore, the exact order of steps may be altered as desired for various applications, and some steps may be performed simultaneously. In addition, while the provided examples are with respect to blackjack, it will be readily understood that other casino and wagering games can be similarly adapted to provide player choices in a similar manner.

It should be understood that the devices, systems and methods described herein may be adapted and configured to function independently or may also interact with other systems or applications, such as for example, a casino management system or player tracking system. As such, the wagering data may be recorded and stored in connection with player information retrieved from the terminal. It should also be readily apparent that additional computerized or manual systems may also be employed in accordance with the disclosure in order to achieve its full implementation as a system, apparatus or method.

Those skilled in the art will readily appreciate that any of the systems and methods of the disclosure may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as an existing electronic gaming machine, portable computing device or electronic platforms with multiple player positions. In addition, the system of the disclosure may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the disclosure so long as players and operators thereof are provided with useful access thereto or the opportunity to play the game as described herein.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An electronic gaming table adapted to host live table games based on wagers with monetary awards based on results of the live table games, the electronic gaming table comprising:

a physical surface adapted for the play of the live table games that include the use of a live dealer and one or more physical game components;

a dealer station situated proximate said physical surface and adapted to provide for the presence of the live dealer at the electronic gaming table, wherein the live dealer facilitates the play of said live table games;

a plurality of player terminals situated at or nearby the electronic gaming table, wherein each of said plurality of player terminals provides for the presence of a live player to play said live table games and includes a player terminal processor coupled to a player interface having one or more player input devices and one or more player output devices; and a table controller coupled to said plurality of player terminals and adapted to control a plurality of electronic gaming table functions, wherein said table controller is further adapted to administer a first live table game pitting a first hand against a second hand, wherein each of a plurality of live players is permitted to make different live game decisions independently based upon the same second hand, and wherein said table controller is further adapted to resolve a game play decision with respect to the second hand based upon collective input by the plurality of live players.

2. The electronic gaming table of claim 1, wherein the collective input comprises a majority decision selected from a plurality of possible game play decisions at a given point in the play of the first live table game.

3. The electronic gaming table of claim 1, wherein the collective input comprises a weighted input from each live player in the first live table game.

4. The electronic gaming table of claim 3, wherein each weighted input is weighted according to an amount wagered by the respective live player.

5. The electronic gaming table of claim 1, wherein the different live game decisions independently based upon the same second hand involve strategic decisions on the play of the same second hand that includes more than only placing the wagers or wager amounts.

6. The electronic gaming table of claim 1, wherein the first hand and the second hand are the only two hands in the first live table game.

7. An electronic gaming table system, comprising:

one or more electronic gaming tables adapted to host live table games based on wagers with monetary awards based on results of the live table games, wherein each of said one or more electronic gaming tables includes:

a physical surface adapted for the play of the live table games that include the use of a live dealer and one or more physical game components, a dealer station situated proximate said physical surface and adapted to provide for the presence of a live dealer at the electronic gaming table, wherein the live dealer facilitates the play of said live table games, a plurality of player terminals situated near said physical surface, wherein each of said plurality of player terminals provides for the presence of a live player to play said live table games and includes a player terminal processor coupled to a player interface having one or more player input devices and one or more player output devices, a table controller coupled to said plurality of player terminals and adapted to control a plurality of electronic gaming table functions, wherein said table controller is further adapted to administer a first live table game pitting a first hand against a second hand, wherein each of a plurality of players is permitted to make different live game decisions independently based upon the same second hand, and at least one interface in communication with said table controller and one or more gaming system components remotely located from said electronic gaming table; and a host server located remotely from and in communication with each of said one or more electronic gaming tables, said host server being adapted to facilitate the processing of transactions with respect to the live table games played at said one or more electronic gaming tables, wherein said system is adapted to resolve a game play decision with respect to the second hand based upon collective input by the plurality of players.

8. The electronic gaming table system of claim 7, wherein the first hand is a house hand for a hosting gaming establishment and the second hand is a player hand for all of the plurality of players.

9. The electronic gaming table system of claim 7, wherein said system is adapted to interact with one or more third party electronic devices as added virtual player terminals for additional live players to play said live table games.

10. The electronic gaming table system of claim 9, wherein said one or more third party electronic devices include at least one mobile device.

11. A method of providing a live table game at a gaming table, comprising:

providing a first electronic gaming table adapted to host live table games based on wagers with monetary awards based on results of the live table games;

presenting a first live table game involving a live dealer at the first electronic gaming table, wherein a first live player and a second live player located at or near the first electronic gaming table both participate in the first live table game, and wherein the first live table game pits a first hand against a second hand, the second hand being a shared player hand that is played by both of the first live player and the second live player;

permitting separate decisions from the first live player and the second live player on the play of the shared player hand during the play of the first live table game; and resolving the first live table game for the first live player and the second live player, wherein said resolving is based upon collective input by a plurality of live players that includes at least the first live player and the second live player.

12. The method of claim 11, further including the step of:

awarding a prize or a monetary payout to the first live player but not the second live player.

* * * * *